UNITED STATES PATENT OFFICE.

MATHEW E. ROTHBERG, OF JOHNSTOWN, PENNSYLVANIA.

PROCESS OF MAKING MAGNESIA-ALUMINA.

SPECIFICATION forming part of Letters Patent No. 657,452, dated September 4, 1900.

Application filed November 23, 1899. Serial No. 738,071. (No specimens.)

*To all whom it may concern:*

Be it known that I, MATHEW E. ROTHBERG, a citizen of the United States, and a resident of Johnstown, in the county of Cambria and State of Pennsylvania, have invented certain new and useful Improvements in Processes of Manufacturing Magnesia-Alumina; and I do declare the following to be a full, clear, and exact description of the invention, such as will enable others skilled in the art to which it appertains to make and use the same.

The invention has relation to the manufacture of magnesia-alumina, ($MgO.Al_2O_3$;) and it consists in the novel process hereinafter set forth.

The principal material which I use in carrying out this process is clay, shale, or similar material of which alumina is a constituent. The clay is treated with sulphuric acid in any of the well-known methods by which the alumina contained in it is changed to alumina sulphate, and this sulphate is leached out with water. The aqueous solution of alumina sulphate thus obtained is what I use in the first step of my process; but I may use alumina sulphate obtained in any other manner or from any other source. The alumina-sulphate solution is brought into suitable tanks or vessels, and to it is added about an equal quantity of lime chloride, either dry or preferably in aqueous solution also. The admixture brings about a reaction, the resultant products of which are insoluble lime sulphate, which settles off, and alumina chloride, which, being soluble, remains in the clear liquor. From this alumina-chloride liquor I obtain magnesia alumina by treating it with magnesian lime either in solid form or in solution. The lime sulphate above referred to as a resultant of the reaction with lime chloride is available for the production of superior plaster-of-paris. This is effected by suitably filtering it from the clear alumina-chloride solution, washing and drying, and finally calcining it at a regulated temperature. The above-described reaction between alumina sulphate and calcium chloride is usually not quite complete, a slight proportion of lime sulphate being soluble in the alumina-chloride liquor. In order to purify the liquor from the residual sulphate, after the solid lime sulphate has been separated I add to the liquor a small quantity of barium chloride, either solid or dissolved in water, in such amount as will precipitate all of the remaining sulphate in the liquor and in addition leave dissolved in the alumina-chloride liquor a slight excess of barium chloride, which does not interfere with the subsequent use of the liquor. On the other hand, the presence of any lime sulphate in the aluminous liquor is injurious. The barium sulphate is now filtered off and is found after suitable washing treatment to be a very fine grade, known in the arts as "precipitated baryta" and extensively used. To the purified solution of alumina chloride is added magnesian quicklime, either dry or in the form of milk of lime, as may be most convenient. The reaction between the lime and the alumina chloride causes the magnesia and alumina to be precipitated from the solution and the lime to go into the solution in its place as lime chloride. This precipitated magnesia-alumina is found to be, after separation from the lime-chloride liquor by any common method of filtration and after suitable washing and calcination, a very superior article for the manufacture of fire-brick. The lime-chloride liquor remaining after the separation of the magnesia-alumina is as a final step in the process returned to the tank used in the first step and is then again combined with a fresh portion of alumina sulphate for the precipitation of lime sulphate, as before. There is thus no loss of lime chloride, as it is used over and over for action of precipitation in fresh portions of alumina-sulphate liquor.

Having described this invention, what I claim, and desire to secure by Letters Patent, is—

1. The process of manufacturing magnesia-alumina, which consists in mixing lime chloride with a solution of alumina sulphate, and subsequently adding to the alumina-chloride solution produced thereby, magnesian lime, substantially as specified.

2. The process of manufacturing magnesia-alumina, which consists in mixing lime chloride with a solution of alumina sulphate, treating the resultant alumina-chloride solution with barium chloride, and adding to the alumina-chloride solution, so treated, magnesian lime, substantially as specified.

3. The process of manufacturing simultaheously, plaster-of-paris, alumina-magnesia, and baryta, which consists in first, mixing together solutions of alumina sulphate and lime chloride, and separating the resultant lime sulphate; secondly, treating the resultant alumina-chloride solution with barium chloride, and separating the resultant barium sulphate; thirdly, adding to the purified alumina-chloride liquor, magnesian lime, and separating the resultant magnesia-alumina, and fourthly, recovering the lime-chloride solution, substantially as specified.

In testimony whereof I affix my signature in presence of two witnesses.

MATHEW E. ROTHBERG.

Witnesses:
JOHN H. BROWN,
EDW. E. LEVERGOOD.